United States Patent
Krawiec et al.

(10) Patent No.: US 12,007,774 B2
(45) Date of Patent: Jun. 11, 2024

(54) SYSTEM AND METHOD FOR GUIDANCE INTEGRITY MONITORING FOR LOW-INTEGRITY MODULES

(71) Applicant: Rockwell Collins, Inc., Cedar Rapids, IA (US)

(72) Inventors: Bryan M. Krawiec, Ashburn, VA (US); Daniel K. Papke, Marion, IA (US); Jason J. Jakusz, Nixa, MO (US); Angus L McLean, Bradenton, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/704,838

(22) Filed: Mar. 25, 2022

(65) Prior Publication Data
US 2023/0305566 A1  Sep. 28, 2023

(51) Int. Cl.
G05D 1/00 (2006.01)
(52) U.S. Cl.
CPC ......... *G05D 1/0214* (2013.01); *G05D 1/0088* (2013.01); *G05D 1/0219* (2013.01); *G05D 1/08* (2013.01)
(58) Field of Classification Search
CPC .. G05D 1/0214; G05D 1/0088; G05D 1/0219; G05D 1/08
See application file for complete search history.

(56) References Cited

U.S. PATENT DOCUMENTS

| | | |
|---|---|---|
| 9,243,930 B2 | 1/2016 | Bushnell |
| 9,355,564 B1 | 5/2016 | Tyson et al. |
| 9,466,219 B1 | 10/2016 | Stefani et al. |
| 9,613,536 B1 | 4/2017 | Wolford et al. |
| 9,927,807 B1 | 3/2018 | Ganjoo |
| 10,018,482 B2 | 7/2018 | Aymeric et al. |

(Continued)

FOREIGN PATENT DOCUMENTS

| | | |
|---|---|---|
| EP | 1769297 A1 | 4/2007 |
| EP | 3866139 A1 | 8/2021 |

(Continued)

OTHER PUBLICATIONS

Krook et al.; Design and Formal Verification of a Safe Stop Supervisor for an Automated Vehicle; 2019 International Conference on Robotics and Automation (ICRA) Palais des congres de Montreal, Montreal, Canada, May 20-24, 2019; pp. 5607-5613 (Year: 2019).*

(Continued)

*Primary Examiner* — Michael J Zanelli
(74) *Attorney, Agent, or Firm* — Suiter Swantz IP (57) ABSTRACT

A system and method for integrity monitoring generates primary control output via a primary module. The primary control output is configured to be used to control an autonomous vehicle (AV). The system and method receive situational data comprising AV data and environmental data. The system and method generate, using a monitor module configured to monitor the AV, a set of fallback actions based on at least the situational data. The system and method generate, using the monitor module, a fallback status based on at least the set of fallback actions, where the fallback status is configured to correspond to a determination of whether to override the primary control output.

18 Claims, 4 Drawing Sheets

(56) References Cited

U.S. PATENT DOCUMENTS

| | | |
|---|---|---|
| 10,032,111 B1 | 7/2018 | Bertram et al. |
| 10,114,373 B2 | 10/2018 | Glebov |
| 10,319,242 B2 | 6/2019 | Sindlinger et al. |
| 10,347,142 B2 | 7/2019 | Brandao et al. |
| 10,414,494 B2 | 9/2019 | Jourdan |
| 10,564,276 B2 | 2/2020 | Eljarat et al. |
| 10,656,643 B1 | 5/2020 | Bertram et al. |
| 10,671,076 B1 | 6/2020 | Kobilarov et al. |
| 10,719,076 B1 | 7/2020 | Gavrilets et al. |
| 10,788,325 B1 | 9/2020 | Lenhardt et al. |
| 10,935,938 B1 | 3/2021 | Bertram et al. |
| 10,962,972 B2 | 3/2021 | Koopman et al. |
| 11,042,673 B1 | 6/2021 | McLean et al. |
| 11,107,001 B1 | 8/2021 | Bertram et al. |
| 11,168,986 B2 | 11/2021 | Allen et al. |
| 2014/0324253 A1 | 10/2014 | Duggan et al. |
| 2017/0090476 A1* | 3/2017 | Letwin ................. B60W 30/08 |
| 2017/0123421 A1 | 5/2017 | Kentley et al. |
| 2018/0231972 A1 | 8/2018 | Woon et al. |
| 2019/0088145 A1 | 3/2019 | Chambers et al. |
| 2019/0289469 A1 | 9/2019 | Bentley et al. |
| 2020/0062417 A1 | 2/2020 | Prosser et al. |
| 2020/0262427 A1 | 8/2020 | Taylor et al. |
| 2020/0380873 A1 | 12/2020 | Boelens et al. |
| 2020/0387163 A1 | 12/2020 | Bhowmick et al. |
| 2021/0158608 A1 | 5/2021 | Boggs et al. |
| 2021/0286651 A1* | 9/2021 | Ho ........................ G06F 3/0608 |
| 2021/0300555 A1 | 9/2021 | Ali et al. |
| 2022/0281478 A1* | 9/2022 | Shedge ............. B60W 60/0015 |
| 2023/0033297 A1* | 2/2023 | Vandapel ............ B60W 60/001 |
| 2023/0280762 A1 | 9/2023 | Krawiec et al. |
| 2023/0280766 A1 | 9/2023 | Krawiec et al. |
| 2023/0280768 A1 | 9/2023 | Krawiec et al. |

FOREIGN PATENT DOCUMENTS

| | | |
|---|---|---|
| GB | 2593263 A | 9/2021 |
| KR | 101772556 B1 | 9/2017 |

OTHER PUBLICATIONS

U.S. Appl. No. 17/704,715, filed Mar. 25, 2022, Daniel K. Papke.
U.S. Appl. No. 17/704,793, filed Mar. 25, 2022, Bryan M. Krawiec.
Extended European Search Report dated Jul. 11, 2023; European Application No. 23159471.4.
Dias, Fernando H. C. et al., "Robust aircraft conflict resolution under trajectory prediction uncertainty", arXiv:2012.08230,URL: https://arxiv.org/abs/2012.08230, Dec. 15, 2020.
Pang, Bo et al., "Trajectory Prediction with Latent Belief Energy-Based Model", arXiv:2104.03086v1 [cs.LG] Apr. 7, 2021,URL: https://arxiv.org/pdf/2104.03086.pdf.

* cited by examiner

SYSTEM AND METHOD FOR GUIDANCE INTEGRITY MONITORING FOR LOW-INTEGRITY MODULES

CROSS-REFERENCE TO RELATED APPLICATIONS

The present application hereby incorporates the following applications by reference in their entirety:
U.S. patent application Ser. No. 17/684,095, filed on Mar. 1, 2022, entitled HIGH FIDELITY TEAMMATE STATE ESTIMATION FOR COORDINATED AUTONOMOUS OPERATIONS IN COMMUNICATIONS DENIED ENVIRONMENTS;
U.S. patent application Ser. No. 17/704,793, filed on Mar. 25, 2022, entitled AUTONOMOUS VEHICLE-BASED MISSION PLANNING AND AUTONOMY SYSTEM FOR MULTI-ASSET COLLABORATIVE OPERATIONS; and
U.S. patent application Ser. No. 17/704,715, filed on Mar. 25, 2022, entitled COLLABORATIVE SEARCH MAPPING FOR AUTONOMOUS MULTI-ASSET TEAMS.

TECHNICAL FIELD

The present disclosure relates generally to integrity monitoring, and, more particularly, to integrity monitoring of guidance control of an autonomous vehicle.

BACKGROUND

The capabilities of autonomy modules (e.g., for autonomous guidance) are continuously expanding and autonomy modules are being employed in situations with ever-increasing complexity, requiring increasing sophistication. Further, the data collected and analyzed by such autonomy modules and sensors of the systems is increasing significantly. Considering this, autonomy modules may be difficult or impossible to certify, exhaustively prove the properties of, and/or analyze the safety and reliability of, and the like. This may, for example, be true for autonomy modules that are complex, new, and/or unpredictable due to their nature.

Early tests and demonstrations (e.g., flight demonstrations) of the autonomy modules may be critical to validating the utility and/or effectiveness of the autonomy modules in operational contexts. However, early demonstrations of low-integrity (e.g., unproven) autonomy modules may not conform to existing standards for safe operation.

SUMMARY

A system for integrity monitoring is disclosed, in accordance with one or more embodiments of the present disclosure. The system may include one or more controllers including one or more processors configured to execute a set of program instructions stored in a memory. The set of program instructions may be configured to cause the one or more processors to generate primary control output via a primary module, the primary control output configured to be used to control an autonomous vehicle (AV). The set of program instructions may be configured to cause the one or more processors to receive situational data comprising AV data and environmental data. The set of program instructions may be configured to cause the one or more processors to generate, using a monitor module configured to monitor the AV, a set of fallback actions based on at least the situational data. The set of program instructions may be configured to cause the one or more processors to generate, using the monitor module, a fallback status based on at least the set of fallback actions.

A method for integrity monitoring is disclosed, in accordance with one or more embodiments of the present disclosure. The method may include generating primary control output via a primary module, the primary control output configured to be used to control an autonomous vehicle (AV). The method may include receiving situational data comprising AV data and environmental data. The method may include generating, using a monitor module configured to monitor the AV, a set of fallback actions based on at least the situational data. The method may include generating, using the monitor module, a fallback status based on at least the set of fallback actions.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

FIGS. 1A through 3 generally illustrate a system and method for integrity monitoring using a set of fallback actions.

In some embodiments, the present disclosure may decouple the concepts of "mission success" and "ensuring safety" through a monitor (e.g., high-integrity monitor module) that sits between a primary autonomy module and an autopilot of an autonomous vehicle (AV). The monitor may allow the primary autonomy module to control the AV as long as no safety violations are detected (or none are eminent). Further, some embodiments of the present disclosure may be analogous to providing constraints on the primary autonomy module so that the primary autonomy module cannot control the AV to perform an unsafe action. In addition, such embodiments may allow the AV to not only get high performance through a complex primary autonomy module, but also high integrity and safety through the monitor. However, in at least some embodiments, the monitor does not guarantee "mission success" (which is up to the primary module), rather the monitor ensures safe operation of the AV.

In at least some of the embodiments herein, the monitor achieves high integrity monitoring, but does not do so by monitoring the guidance commands of the primary autonomy module itself, but rather monitors a set of fallback (acceptable alternative) actions to ensure that there is always at least one fallback action that may be utilized. In some embodiments, the primary control output of the primary autonomy module may be used to control the AV by simply passing the primary control output through the monitor when appropriate (e.g., safe), otherwise the primary control output may be overridden and a different action may be taken.

In some embodiments, an AV 100 is at least one of a manned or an unmanned vehicle. For example, "autonomous" may include the operation of manned and unmanned vehicles when such systems are being actively controlled by an embedded AV subsystem, where fallback control (i.e. overriding the primary control module) must be handled by the AV subsystem (e.g., the AV 100 may not rely on an operator/human to assume control in the event of a failure of the primary control module).

Embodiments of the present disclosure are directed to integrity monitoring by generating a set of fallback actions and determining/generating when to override primary control output (e.g., guidance) of a primary module of an autonomous vehicle (AV) based on the set of fallback actions. Benefits of one or more embodiments of this disclosure include a low-complexity, low-cost system and method that is compatible with a variety of complex, low-integrity, primary autonomy modules to provide increased integrity, assurance, and safety.

In some embodiments, the system 10 may be conceptualized in at least four steps (but not necessarily in the following order). First, a set of fallback actions 106 are generated. Second, each fallback action 106 is evaluated against one or more sub-monitors 114 (e.g., terrain avoidance sub-monitor). Third, the sub-monitor output 116 of each sub-monitor 114 of each fallback action 106 are normalized for uniform comparison. Fourth, a monitor output 118 is generated based on the sub-monitor outputs 116. The monitor output 118 may include at least one of fallback status 124, safe guidance control output 120, and/or fallback action ID 122, and be used to determine when the primary control output 134 of the primary module 104 should be overridden. Safe guidance control output 120 may be any control output such as primary control output 134 of the primary module when there are sufficient safety margin of available fallback actions, or safe guidance control output 120 may be different guidance commands (e.g., any control output) when fallback status 124 indicates unsafe conditions of the AV 100 (e.g., poor minimum safety margin data of the fallback actions). Fallback status 124 may be any data or value configured to indicate that the primary control output 134 shown be overridden. Fallback action ID 122 may be any data or value indicative of a fallback action 106 to be performed. For example, a fallback action ID 122 may correspond to an action (e.g., maximum bank right action) and be used by the system 10 to determine a control output (e.g., timeseries of actuator commands) to cause the AV 100 to perform the action.

Generating the set of fallback actions, in at least some embodiments, allows for, in a general sense, "monitoring" the integrity (e.g., reliability, predictability, safety) of a primary module (e.g., guidance module that controls an AV) by virtue of the set of fallback actions being analogous to a set of safe alternative actions (e.g., last ditch abort actions) that an AV may take to avoid being in an undesired condition (e.g., crashing, being in undesired airspace). In this regard, the monitor module may generate an output analogous to an "override" command/status to ensure that when the set of available fallback actions is considered low (e.g., or any other determination which may indicate an undesired condition is eminent), that the primary control output 134 of the primary module (e.g., AV guidance module) is overridden (e.g., to ensure the undesired condition is avoided). In other words, in some embodiments, when the set of acceptable fallback actions (e.g., safe alternative actions) falls below a certain level (e.g., a "turn right" fallback action may become unavailable/unsafe as an obstacle is approaching), a monitor module may cause primary control output of the autonomous vehicle to be overridden.

Further, in the context of autonomy modules (e.g., primary module), some autonomy modules of an AV may be unproven or hard to prove (e.g., certify, exhaustively prove the properties of, analyze the safety and reliability of to a threshold, and the like). An autonomy module may be deemed too risky and/or unpredictable to be used in-flight due to its unproven nature. However, the autonomy module may need to be used in-flight in order to test the autonomy module (e.g., validate its utility and/or effectiveness in an operational context).

As such, it is contemplated herein that a system and method for integrity monitoring of autonomy modules (e.g., unproven complex autonomy modules) that increases the safety and/or predictability of using the autonomy modules using a set of fallback actions may, in some embodiments, solve the issues described above. In some embodiments, benefits of such a system and method include, but are not limited to, integrity monitoring of a autonomy module; improved safety/reliability/behavior of a system (e.g., overall autonomy system/module); being able to test an otherwise unproven autonomy module incapable of being proven/certified (e.g., due to being complex); and faster prototyping and testing of unproven autonomy modules (e.g., including autonomy modules that could be proven in the future but have not been proven yet).

Figure 1A:
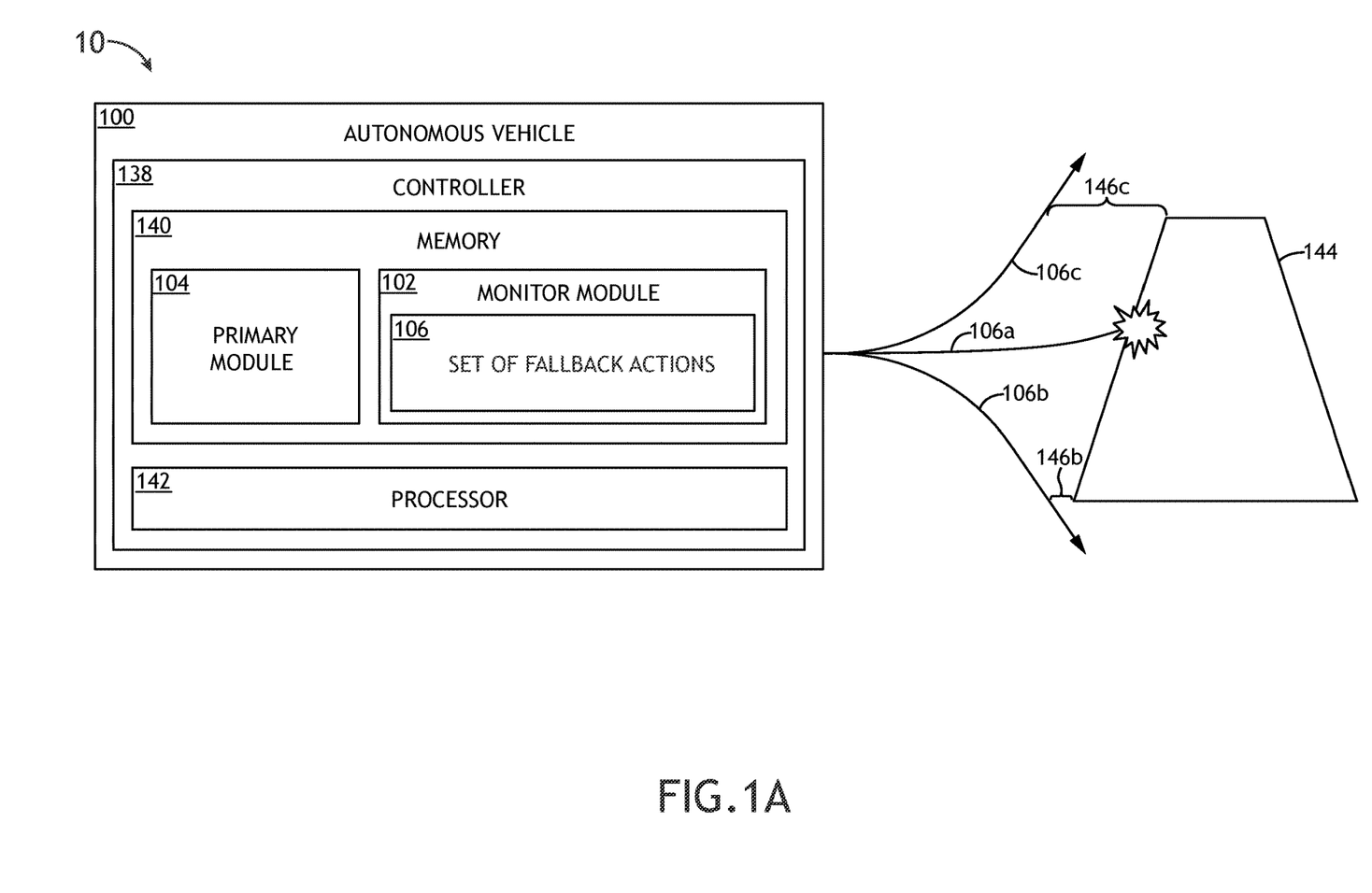
FIG. 1A illustrates a conceptual view of a system for integrity monitoring in the context of a schematic view of various fallback actions, in accordance with one or more embodiments of the present disclosure.

FIG. 1A illustrates a conceptual view of a system 10 for integrity monitoring in the context of a schematic view with various fallback actions 106, in accordance with one or more embodiments of the present disclosure.

The system 10 may include (or be) an autonomous vehicle (AV) 100. In other embodiments, AV 100 comprises the system 10 or the system 10 is an offboard (remote) system 10 and remotely communicates to AV 100 via one or more wireless communication devices (not shown). The system 10 may include a primary module 104 and a monitor module 102 for integrity monitoring (e.g., of the AV 100). The AV 100 may further include a controller 138, a memory 140, and a processor 142.

In one embodiment, the primary module 104 may be configured to be used to control the AV 100 (e.g., steer, set waypoints, perform any type of action, etc.). In one embodiment, the primary module 104 is unproven. For example, as described, unproven may mean not able to be exhaustively tested. For instance, the primary module 104 may be an unprovable complex autonomy module (e.g., function). The primary module 104 (e.g., primary control module) may include any control module which may receive as input any situational data (e.g., from other modules, from sensors, from wireless communication with any other source of information (e.g., vehicle, base station, remote sensor, satellite, and the like)). Control modules (e.g., primary control modules, which may be unproven) at multiple levels of planning (e.g., team-level, asset-level, and the like) are generally discussed in U.S. patent application Ser. No. 17/704,793, filed on Mar. 25, 2022, entitled AUTONOMOUS VEHICLE-BASED MISSION PLANNING AND AUTONOMY SYSTEM FOR MULTI-ASSET COLLABORATIVE OPERATIONS, which is herein incorporated by reference in the entirety. Situational data exchange between assets of a team of assets is discussed in U.S. patent application Ser. No. 17/704,715, filed on Mar. 25, 2022, entitled COLLABORATIVE SEARCH MAPPING FOR AUTONOMOUS MULTI-ASSET TEAMS, which is herein incorporated by reference in the entirety. Situational data exchange of teammate state estimation is discussed in U.S. patent application Ser. No. 17/684,095, filed on Mar. 1, 2022, entitled HIGH FIDELITY TEAMMATE STATE ESTIMATION FOR COORDINATED AUTONOMOUS OPERATIONS IN COMMUNICATIONS DENIED ENVIRONMENTS, which is herein incorporated by reference in the entirety.

The monitor module 102 may include (and/or generate) a set of available fallback actions 106 to be used in integrity monitoring (e.g., but not limited to, a maintain course action 106a, a turn right action 106b, and a turn left action 106c as shown in FIG. 1A). Although only three fallback actions 106 are shown in FIG. 1A, all of which are of a maneuvering type, the set of fallback actions 106 may be any number and any type (or multiple types) of actions within any scope (or multiple scopes) (e.g., high level action such as a "abort mission" action, medium level "turn left" action, low/detailed level set of time-series of one or more specific actuator controls for performing a specific action such as a maneuver). Similarly, any control output, guidance command, and the like of this disclosure may likewise, unless otherwise noted, be any type of control or within any scope.

In one example, the set of fallback actions 106 may be a set of pre-determined fallback action generators 106. In this regard, the fallback action generators 106 may be a list of some or all of the possible actions (e.g., maneuvers, actions, and the like) that the AV 100 or system 10 is capable of performing. In another example, the set of fallback actions 106 may be determined/generated (e.g., based on situational data). Generally speaking, and described in more detail later in this disclosure, the set of fallback actions 106 may be indicative of a theoretical set of possible actions that the AV may take (e.g., and possibly limited to those which may be safely taken) to abort its current action/behavior to avoid an undesired condition from occurring. The set of fallback actions 106, may in some examples, be two or more fallback actions 106 or any other number of fallback actions (e.g., or only limited by the allocated processing power and/or time constraints of the system 10).

In one embodiment, at least one fallback action 106 of the set of fallback actions 106 comprises at least one of: a turn circle, a Bezier curve, or a timeseries of guidance commands.

Referring now to the AV 100, the AV 100 may comprise aerial, land, or sea vehicles. For example, the AV 100 may comprise one or more unmanned aerial vehicles (UAVs) or drones. The AV 100 may perform one or more mission tasks/objectives. Tasks include, but are not limited to, search and rescue, pipeline surveillance, reconnaissance, mapping, and extending networked communications. For example, the AV 100 may travel to a location of an objective via default navigation trajectories, and perform additional mission tasks at the shared objective. The AV 100 may encounter non-objective obstacles 144. The obstacles 144 may comprise, but are not limited to general obstacles (buildings, towers, bridges, dams, peer AVs, other vehicles, etc.), zones (keep-in zone boundaries, keep-out zone boundaries), terrain (mountains, hills, canyons, valleys, rocks, etc.), adversarial threats (e.g., military structures, vehicles, weapons, etc.), weather (e.g., thunderstorms, hurricanes, fog, ice, snow, rain, winds, etc.).

In some embodiments, an AV 100 is a vehicle that is fully autonomous (e.g., UAV) such that a user of the AV 100 is remote from the AV 100; but, in some embodiments, the user may be still capable of providing some remote feedback/control. In other embodiments, the AV 100 is a vehicle with autonomous capabilities (e.g., performs one or more tasks via a primary module 104 mainly autonomously) but the vehicle may be capable of simultaneously having a user (e.g., human pilot, overseer) in the vehicle during operation such that the user may provide input (e.g., drive/fly the vehicle, decide tasks, and/or takeover) if desired. In this regard, the user may provide an extra dimension of integrity monitoring. In some embodiments, the user may select a mission task for the AV 100. For example, the primary module may be a complex autonomy module configured to achieve objectives corresponding to high level mission level coordination and/or vehicle level action planning.

Referring now to the controller 138, the processor (e.g., processing circuit) 142 includes at least one processor 142, which may be any type of general purpose or special purpose processor (e.g., FPGA, CPLD, ASIC, etc.), and at least one memory 140, which may be any type of computer or machine-readable storage medium (e.g., ROM, RAM, hard disk, flash memory, etc.). The processing circuit 142 may be paired with or a component of a communication link, such as via a networking interface (e.g., Ethernet).

The memory 140 may include one or more modules including instructions that may be executed by processing circuit 142 to perform various processing modules and/or provide various output (e.g., data, guidance control) for the system 10.

It should be noted that, in some embodiments, due to a safety criticality of the monitor module 102, the monitor module 102 is run on a real-time operating system (RTOS) on a high-integrity computing platform (e.g., both hardware and operating system). Further, in some embodiments, the monitor module 102 may be a high priority module and/or may be configured to have priority when executing on a controller 138. For example, monitor module 102 may be configured to at least one of: have priority, not be resource starved, partitioned from non-safety critical software/modules, and the like).

Figure 1B:
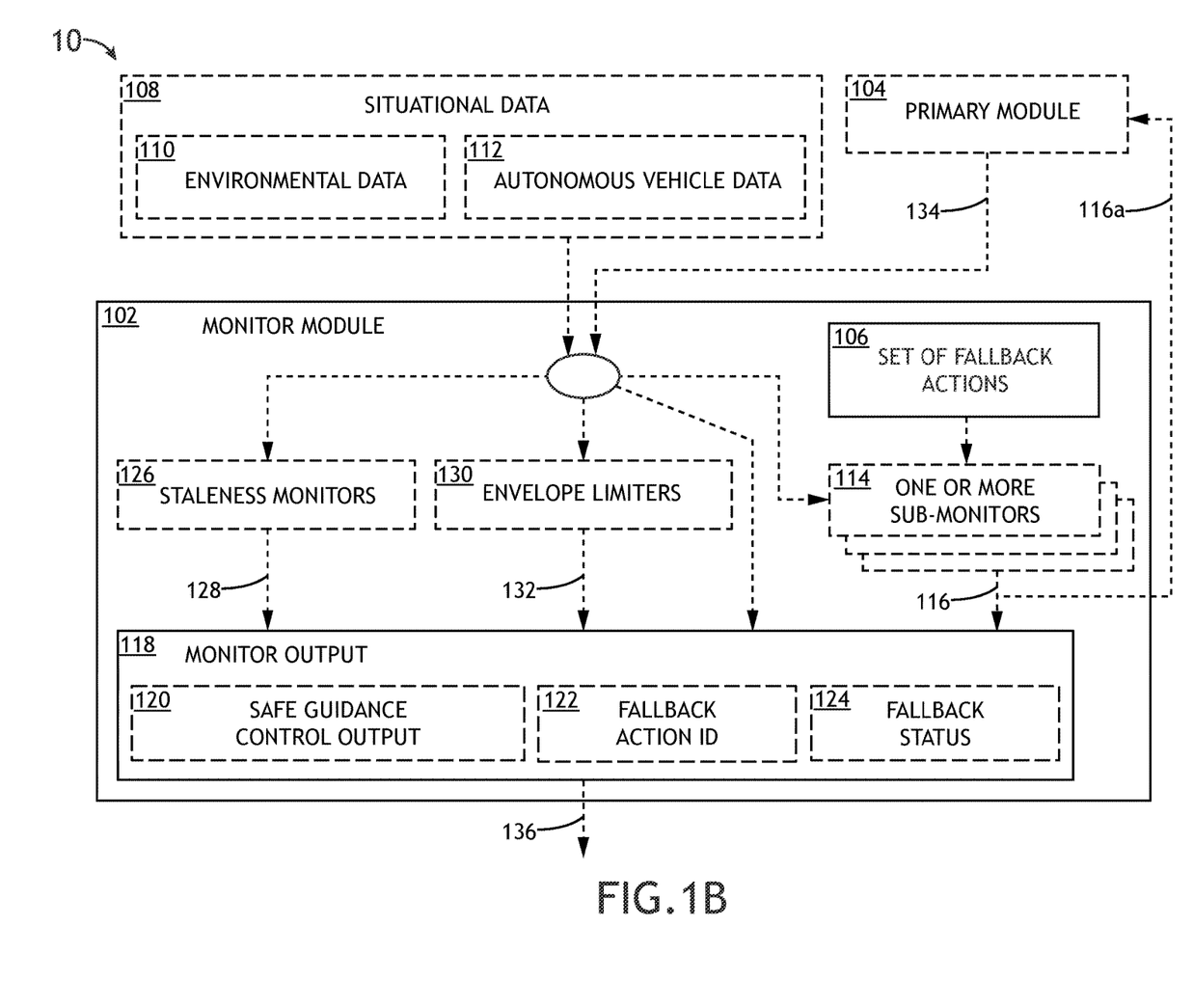
FIG. 1B illustrates a schematic view of a system for integrity monitoring, in accordance with one or more embodiments of the present disclosure.

FIG. 1B illustrates a schematic view of a system 10 for integrity monitoring, in accordance with one or more embodiments of the present disclosure. Various elements of the system 10 are described in detail.

As mentioned, the system 10 may include a monitor module 102. In some embodiments, the monitor module 102 may receive (at least some portion of) situational data 108 (which is not necessarily a part of system 10) (e.g., as input for various elements and outputs of monitor module 102, and the like). Likewise, the primary module 104 of the system may receive as input data at least some of situational data 108. The situational data 108 may include environmental data 110 and AV data 112. For example, situational data 108 may include data of, but not limited to, any sensor, data source, other vehicle, or the like that is related to the environment relevant to the AV 100, or data relevant to the AV 100 itself. For example, environmental data 110 may include, but is not limited to, maps, radar sensor data, lidar sensor data, data of locations of obstacles (e.g., other vehicles), mission/task data of other vehicles, and/or any other data not categorized as closely related to the AV 100 itself and its own behaviors. AV data 112 may include any data closely related to the AV 100 and its own behaviors such as, but not limited to, location of the AV 100, distance of the AV 100 to obstacles, size of the AV 100, fuel remaining of the AV 100, and/or data (e.g., sensor data) related to performance, speed, altitude, mission/task data of the AV, control output of the AV, and/or health of AV systems, or the like.

The primary control output 134 (e.g., nominal command control output) of primary module 104 (e.g., generated by primary module 104) may be configured to be used to control the AV 100 (e.g., steer, set waypoints, perform any type of action, etc.).

In some embodiments, primary control output 134 may include guidance commands.

In some embodiments, the monitor module 102 receives the primary control output 134 (e.g., as input for various elements and outputs of monitor module 102, and the like) as shown in FIG. 1B. In this regard, the monitor module 102 may be used to monitor (e.g., filter) the primary control output 134, and, in a sense, pass the primary control output 134 through, or override, when desired. In this regard, generally, the monitor module 102 may be "aware" of the primary control output 134 being performed or planning to be performed by the AV 100. In one example, the safe guidance control output 120 of the monitor output 118 of the monitor module 102 is the primary control output 134. In one example, the primary control output 134 includes at least one of waypoints, guidance commands, or inner loop commands. Likewise, primary module 104 may output the primary control output 134 that includes at least one of waypoints, guidance commands, or inner loop commands. In embodiments, monitor module 102 may output at least some of monitor output 118 (as shown by monitor control output 136) that may include refined/updated/safe versions of at least one of one or more of the waypoints, guidance commands, or inner loop commands of primary control output 134. It should be noted that such monitor control output 136 may be refined/safer/etc. than primary control output 134 by virtue of being based on the set of fallback actions 106 (e.g., and/or, staleness monitors 126, envelope limiters 130, one or more sub-monitors 114, situational data 108, and/or the like).

Monitor control output 136 (e.g., safe guidance control output 120) and primary control output 134 may be similar (e.g., or the same) in that each may be configured to be used to control the AV 100. For example, each may be configured to be used by a control module (e.g., air vehicle provider) of system 10. For example, the control module (not shown) may comprise at least one of a waypoint sequencer, outer-loop autopilot, or inner-loop autopilot configured to generate actuator commands of the AV 100 based on control output (e.g., monitor control output 136, primary control output 134, safe guidance control output 120, and the like).

In one example, guidance commands include at least one of airspeed, heading, altitude, or vertical speed. In another example, inner loop commands include at least one of pitch or bank.

In another embodiment, the monitor module 102 includes one or more sub-monitors 114. The one or more sub-monitors 114 may include any number and type of sub-monitors. In one illustrative example, each sub-monitor may generally be used to monitor one or more safety margins (e.g., corresponding to constraints, risks, and/or considerations) of the AV 100 in relation to a particular fallback action 106 of the set of fallback actions 106.

In at least some examples, each fallback action 106 (e.g., parameterized maneuvering path of a fallback action 106) is input into (e.g., processed by, received by, and the like) each sub-monitor of the one or more sub-monitors 114 and each sub-monitor generates safety margin data (based on the fallback action 106 and/or situational data 108 that was input) and which may correspond to the particular type of constraint/risk/consideration that that sub-monitor 114 is configured to evaluate. Further, in at least some embodiments, at least some of the one or more sub-monitors generate the safety margin data based on at least some of the situational data 108.

In some embodiments, the safety margin data may be indicative of at least one of: a remaining safety margin distance within which a controlled action is determined to be able to be completed by the AV 100, a controlled action corresponding to each fallback action 106; a remaining safety margin time within which the controlled action is determined to be able to be completed by the AV 100; or a likelihood of the AV being able to successfully and/or safely complete the controlled action at a given time.

For instance, in regards to a non-limiting illustrative example using FIG. 1A, environmental data 110 (e.g., radar) of an obstacle 144 (e.g., mountain) may be used by a sub-monitor 114 (e.g., terrain avoidance geometry monitor, and the like) to determine that a first fallback action 106a (e.g., fly straight action 106a) has a first-fallback-action first-sub-monitor safety margin of 0 (corresponding to 0 safety margin distance), a second fallback action 106b (e.g., turn right action 106b) has a second-fallback-action first-sub-monitor safety margin of 1 (corresponding to a second safety margin distance 146b of FIG. 1A), and a third fallback action 106c (e.g., turn left action 106c) has a third-fallback-action first-sub-monitor safety margin of 2 (corresponding to a third safety margin distance 146c). In this regard, the third-fallback-action first-sub-monitor safety margin 146c may be indicative of a relatively high clearance (third safety margin distance 146c) between the AV 100 and the obstacle 144 in the event that the "turn left" third fallback action 106c were to be performed at that moment in time. Note, as shown in FIG. 1A for some embodiments, the monitor module 102 has, in a sense, a nuanced perception of the surroundings of the AV 100 such that the monitor module 102 can determine the difference in safety margin of a "turn left action" 146c versus a "turn right action" 146b, dynamically and in real time (e.g., caused by a variety of factors, such as the direction the AV 100 is heading, the shape of the obstacle 144, and the particular fallback actions 106 to be analyzed).

It should be noted that the above example is for illustration purposes only and is not intended as limiting to the number or type of fallback actions 106 or the number or type of sub-monitors 114, and that any number or type may be used (e.g., multiple types of sub-monitors 114 for multiple fallback actions 106).

It is further noted, in some embodiments, the safety margin data may be normalized in relation to other sub-monitors 114 (e.g., all of the one or more sub-monitors 114). For example, the safety margin data may be normalized by virtue of being at least one of numerically normalized or categorically normalized and each sub-monitor 114 may be configured to perform such normalization. Normalization generally allows for the safety margin data of various sub-monitors 114 to be uniformly compared to one another.

As an illustrative example of categorical normalization, the safety margin data may be categorically normalized such as may be analogous to a "stoplight" concept. In such a concept, the safety margin data for each sub-monitor and fallback action combination is put into two (or three) or more categories. For example, if there is 0 meters (e.g., or seconds) or less of safety margin remaining (e.g., of a trajectory) to perform a particular fallback action 106 in the context of a particular sub-monitor 114, then that safety margin data may be indicative of a negative safety margin ("red light" category; safety violation). Similarly, if there is 0 up to a specific value (e.g., 40 meters) of safety margin remaining, then the safety margin data may be indicative of a low safety margin ("yellow light" category; safety violation imminent). Further, if there is more than the specific value of safety margin remaining, then the safety margin data may be indicative of a sufficient safety margin ("green light" category; no concern). On a side note, a monitor fault category may exist, such as when a safety margin is not properly determined/generated (e.g., error, improper input).

Generally, in regards to the example above, safety margin data (e.g., categories) of different normalized sub-monitor types may be compared to uniformly assess the safety margin data 114 of multiple available fallback actions 106. It should be noted that uniform comparison of safety margin data (e.g., normalized categories) may be used in the determination/generation of monitor output 118 (e.g., fallback status 124; in a determination of whether to override the primary control output 134).

Non-limiting examples of the one or more sub-monitors 114 include geometry monitors (e.g., configured to generate geometry safety margin data) such as a peer avoidance geometry monitor; a keep-in geofencing geometry monitor; a keep-out geofencing geometry monitor; and a terrain avoidance geometry monitor. Other examples include any monitor related to the AV 100 or the environment that may monitor a constraint, goal, consideration, risk, and/or the like such as, but not limited to, non-geometry-based monitors such as low-fuel monitors, and safe detonation monitors.

Note that at least some of the one or more sub-monitors 114 may be configured to be high-integrity and/or proven (e.g., provably and/or exhaustively testable). For example, a sub-monitor may be certified and/or certifiable. In another example, the sub-monitor (e.g., a program, sub-program, lines of code) may be configured such that all of its outputs for a given set of inputs are provably and exhaustively testable. For instance, as an illustration, some machine learning models are not exhaustively testable because they may be analogous to a "black box" that may output a semi-random output when given types of inputs never before trained on and even conventional code may be too complex to exhaustively test every possible input and/or output. Certain conventional code (e.g., C++, C, python, or any other type of code) that is not complex, on the other hand, may be an illustrative example of a module that is proven/provable in that (e.g., if the code and/or possible inputs are simple and/or finite enough), the outputs of the code/module may be exhaustively testable to either the fullest range of possible outputs or to an acceptable degree/threshold.

Likewise, it should be noted that in some embodiments the various elements of the monitor module 102 (e.g., including but not limited to modules, outputs, monitors, sub-monitors, outputs, etc.) and the architecture of the monitor module 102 may each individually, and/or in combination, be proven/provable (e.g., configured to be exhaustively provable and testable, certifiable, and/or the like).

Referring now generally to the one or more sub-monitors 114, the one or more sub-monitors 114 may generate a sub-monitor output 116. The sub-monitor output 116 may, for example, be received by the monitor output 118 and be used by the monitor output 118 to generate at least one of a safe guidance control output 120, a fallback action ID 122, or a fallback status 124. Conceptually, the sub-monitor output 116 may be the set of fallback actions 106 which may include the one or more safety margin data associated with each fallback action 106. In another example, the sub-monitor output 116 may be the safety margin data only. Benefits of at least some embodiments include that the one or more sub-monitors 114 may be used to generate one or more safety margin data for each fallback action 106, which may be used by the monitor output 118 for a variety of purposes (e.g., to determine when to override and what action the AV 100 should take). It is noted that the schematic of FIG. 1B shall not be viewed as limiting of this disclosure (e.g., how data is handled or a structure of monitor module 102).

In one embodiment, the sub-monitor output 116 may include, for each fallback action 106, the minimum safety margin data (e.g., minimum "stop light" categorical value) of the one or more safety margin data of each fallback action 106. Further, the sub-monitor output 116 may include action guidance commands (e.g., safe guidance commands based on the fallback action, the situational data 108, and/or the sub-monitor 114).

Additionally, in one embodiment, such minimum safety margin data for each fallback action 106 may also be provided to primary module 104 (as shown by sub-monitor status output 116a). In this regard, the primary module may, for example, use such data to configure itself, learn, and/or the like.

In another embodiment, the monitor output 118 may include failover guidance control output. Failover guidance control output may be configured to be used when there are no fallback actions 106 with sufficient safety margin. For example, failover guidance control output may include providing/using the fallback action 106 with the highest (safest) minimum safety margin data value.

In another embodiment, the monitor output 118 may include failsafe guidance control output (e.g., last resort guidance). Failsafe guidance control output may be configured to be used when sub-monitors 114 cannot make proper evaluations (e.g., a rare occurrence of error) and/or all fallback actions 106 are of a "safety violation" category/ value. Failover guidance control output may include, for example, keeping wings level, requesting a backup user to take control, or the like.

In another example, sub-monitor status output 116a may include (or further include) a status (e.g., fallback status 124) of the monitor output 118. In this regard, the sub-monitor status output 116a may allow for an autopilot (not shown) and/or a user to take control in the case of an override determination (e.g., the status may be used to alert a pilot to take control or for an autopilot to take control).

In one embodiment, the monitor module 102 may include staleness monitors 126 and/or envelope limiters 130. The staleness monitors 126 may generate staleness monitor output 128 and may be configured to determine the staleness of situational data 108. The envelope limiters 130 may generate envelope limiter output 132 and be configured to determine the limits/boundaries (e.g., safe limits) of primary control output 134. For example, the staleness monitor output 128 and envelope limiter output 132 may be based on primary control output 134 and/or situational data 108. For example, staleness monitor output 128 may include a command stale alert and/or a situational data stale alert. For example, envelope limiter output 132 may include limited guidance commands (e.g., primary control output 134 limited by certain envelopes/constraints) and an envelope protection mask (e.g., bitmask). For example, the limited guidance commands may be provided to the monitor output 118 and used to control the AV 100 when the monitor output 118 determines that there are adequate fallback actions 106 available for use.

Figure 2:
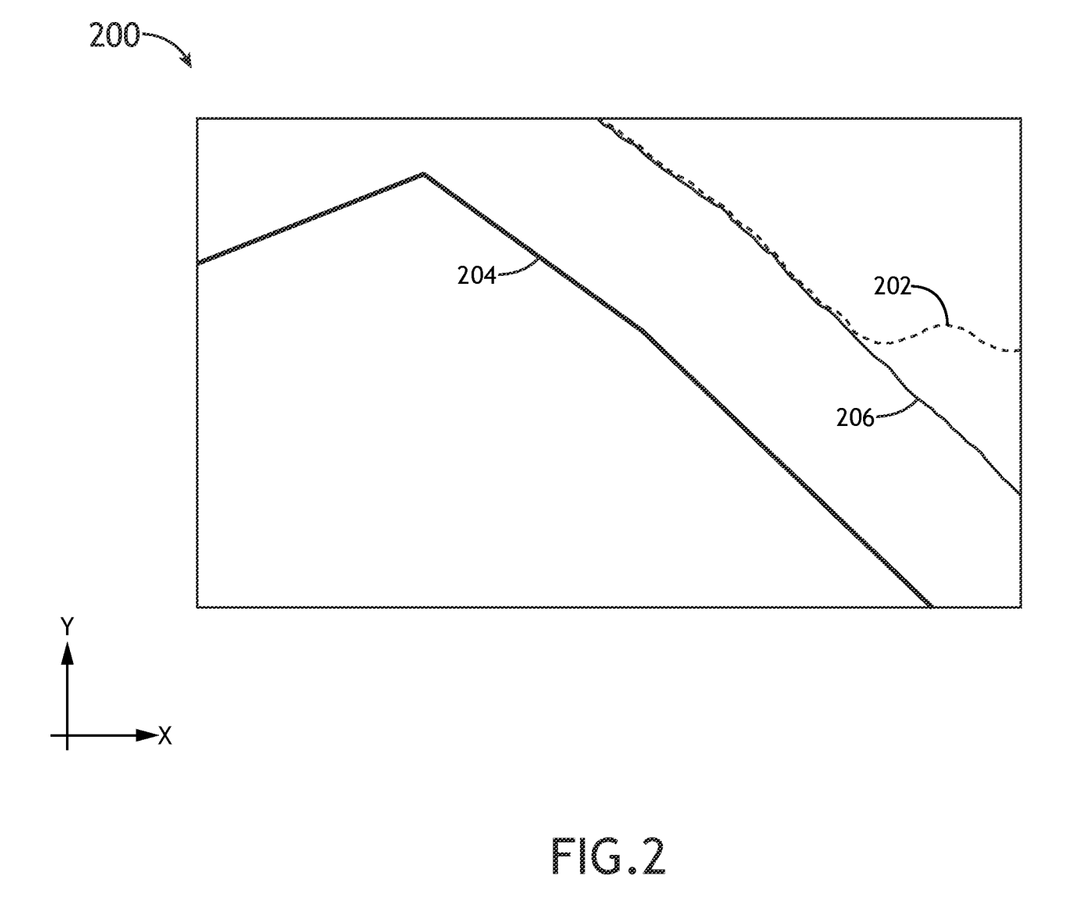
FIG. 2 illustrates a top-down view of a path of an AV with integrity monitoring, in accordance with one or more embodiments of the present disclosure.

FIG. 2 illustrates a top-down view of an AV path 202 of AV 100 with integrity monitoring, in accordance with one or more embodiments of the present disclosure. The AV path 202 is shown in the context of a boundary 204 (e.g., keep-out boundary 204) and a boundary with margin 206.

Note that, in some embodiments, the AV 100 with integrity monitoring may maintain a close proximity with a boundary over time (e.g., "riding the rails") as shown in FIG. 2. For example, the AV 100 may be controlled to head in a primarily negative X-direction while under control by a primary control output 134. As the AV 100 approaches a certain margin distance away (e.g., 1 km) from boundary 204 (as illustrated by boundary with margin 206), the AV path 202 may change course as it switches to a fallback mode (e.g., as may be determined/controlled by monitor module 102). For example, as shown in FIG. 2, AV 100 may generate/issue a "max bank right" control output to avoid crossing the boundary with margin 206. As shown in FIG. 2, this process may be dynamic, such that as the primary control output 134 continues to attempt to steer the AV 100 in the negative X-direction, the fallback mode (e.g., fallback status 124) may switch on and off repeatedly, as necessary, to keep the AV 100 out of the area inside the boundary with margin 206. This may be a favorable output.

Referring back to system 10 generally, in some embodiments, the process of generating a set of safety margin data and/or any other step or combination of steps in this disclosure may be performed iteratively (e.g., up to 10 Hz or 20 Hz if the AV 100 doesn't maneuver aggressively/quickly, or otherwise up to 50 Hz or 100 Hz). Also, in one example, as illustrated in FIG. 2, the system 10 does not latch (e.g., allows the primary control output 134 to re-take control of the AV 100).

Figure 3:
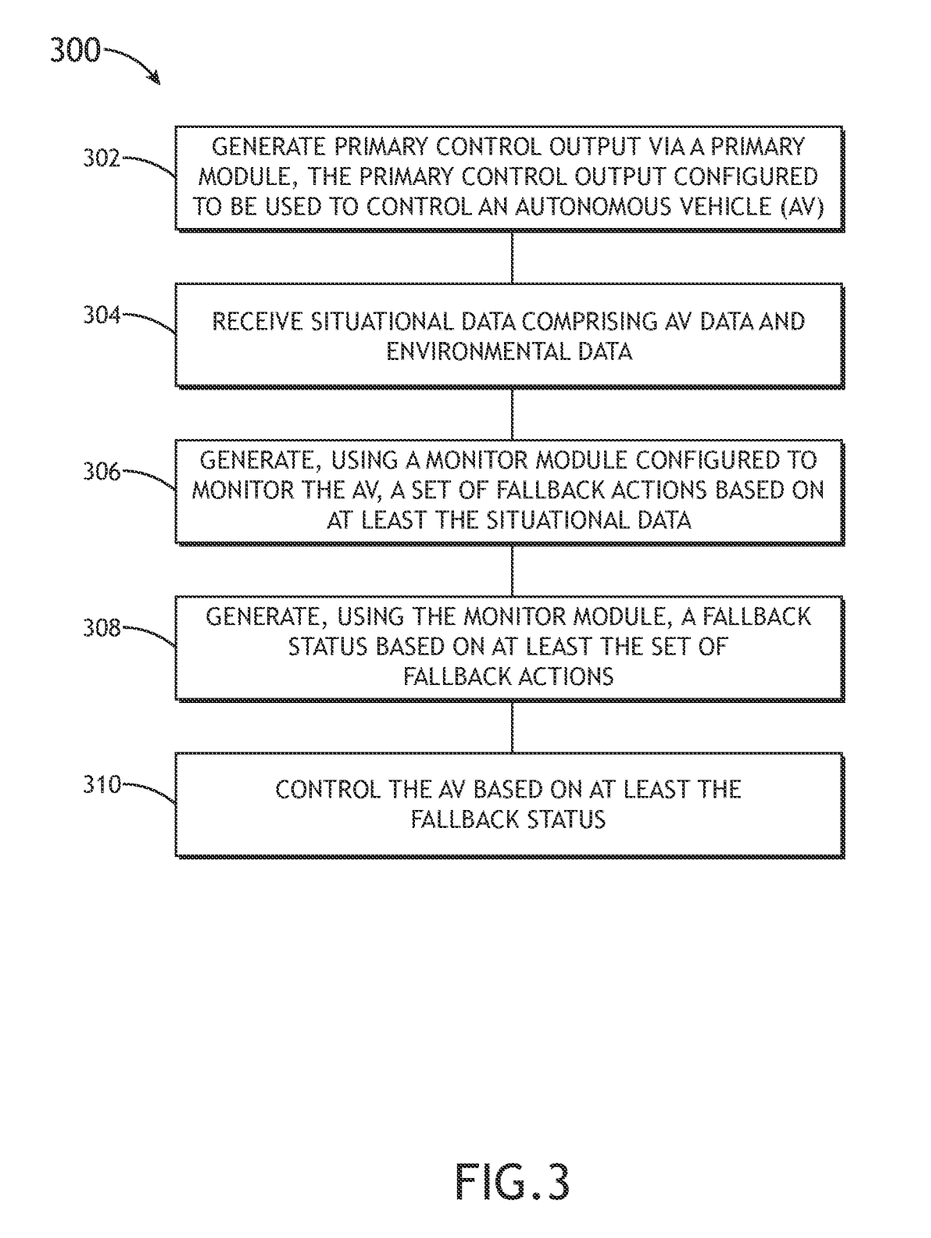
FIG. 3 illustrates a flowchart of a method for integrity monitoring, in accordance with one or more embodiments of the present disclosure.

FIG. 3 illustrates a flowchart of a method for integrity monitoring, in accordance with one or more embodiments of the present disclosure.

Referring now to method 300 of FIG. 3, it should be noted that various embodiments of system 10 may be implemented to perform one or more of the following steps of method 300 and various embodiments, examples, and elements of system 10 may be understood to be described by the following non-limiting disclosure related to method 300. For example, the system may include one or more controllers 138 including one or more processors 142 configured to execute a set of program instructions stored in a memory 140, the set of program instructions configured to cause the one or more processors 142 to perform one or more of the steps of method 300.

In a step 302, in one embodiment, primary control output 134 is generated via a primary module 104, the primary control output 134 configured to be used to control an autonomous vehicle (AV) 100.

In a step 304, in the same or a different embodiment, situational data 108 comprising AV data 112 and environmental data 110 is received (e.g., received by controller 138, AV 100, system 10, monitor module 102, and/or the like).

In a step 306, in the same or a different embodiment, a set of fallback actions 106 based on at least the situational data 108 is generated using a monitor module 102 configured to monitor the AV 100.

In a step 308, in the same or a different embodiment, a fallback status 124 based on at least the set of fallback actions 106 is generated using the monitor module 102. In one example, the fallback status 124 is configured to correspond to a determination of whether to override the primary control output 134.

In a step 310, in the same or a different embodiment, the AV 100 is controlled based on at least the fallback status 124. For example, if the fallback status 124 is indicative of a positive determination to take control (override) the primary control output 134, then the primary module 104 control of the AV 100 may be overridden (e.g., one or more outputs/controls/actions may be generated that are configured to control the AV 100 and/or a fallback action 106 of the set of fallback actions 106 may be configured and used to control the AV 100). For instance, if there is only one remaining fallback action 106 that can safely be performed, the controller 138 (or method 300) may cause an action corresponding/related/similar to that fallback action 106 to be performed by the AV 100. In another example, as mentioned, the monitor module 102 may output a monitor output 118 (e.g., override/fallback output/guidance) that includes refined/updated/safe versions of at least one of waypoints, guidance commands, or inner loop commands.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

The inventive concepts disclosed herein are described above with reference to drawings. These drawings illustrate certain details of specific embodiments that implement the systems and methods and programs of the present disclosure. However, describing the inventive concepts with drawings should not be construed as imposing on the inventive concepts disclosed herein any limitations that may be present in the drawings. Embodiments of the inventive concepts disclosed herein contemplate methods, systems and program products on any machine-readable media for accomplishing its operations. Embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments of the inventive concepts disclosed herein include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general-purpose computer, special purpose computer, or special purpose processing machine to perform a certain module or group of modules. Machine or computer-readable storage media, as referenced herein, do not include transitory media (i.e., signals in space).

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for integrity monitoring, the system comprising:
    one or more controllers including one or more processors configured to execute a set of program instructions stored in a memory, the set of program instructions configured to cause the one or more processors to:
        generate primary control output via a primary module, the primary control output configured to be used to control an autonomous vehicle (AV);
        receive situational data comprising AV data and environmental data;
        generate, using a monitor module configured to monitor the AV, a set of fallback actions based on at least the situational data; and
        generate, using the monitor module, a fallback status based on at least the set of fallback actions,
        wherein the fallback status is configured to correspond to a determination of whether to override the primary control output,
        wherein the monitor module comprises one or more sub-monitors,
        wherein each fallback action of the set of fallback actions comprises one or more safety margin data,
        wherein each of the one or more safety margin data for the each fallback action is based on at least the situational data and the each fallback action, and is generated via a sub-monitor of the one or more sub-monitors.

2. The system of claim 1, the set of program instructions further configured to cause the one or more processors to control the AV based on at least the fallback status.

3. The system of claim 2, the control the AV further based on at least a safe guidance control output of the monitor module, the safe guidance control output based on at least the set of fallback actions and the situational data.

4. The system of claim 1, wherein the one or more safety margin data is indicative of at least one of:

a remaining safety margin distance within which a controlled action is determined to be able to be completed by the AV, the controlled action corresponding to the each fallback action;
a remaining safety margin time within which the controlled action is determined to be able to be completed by the AV; or
a likelihood of the AV being able to successfully and/or safely complete the controlled action at a given time.

5. The system of claim 4, wherein the one or more sub-monitors are configured to normalize the one or more safety margin data such that any one of the one or more safety margin data may be uniformly compared to any other one of the one or more safety margin data.

6. The system of claim 5, wherein the one or more sub-monitors comprise one or more geometry monitors,
wherein each geometry monitor of the one or more geometry monitors is configured to generate one or more geometry safety margin data of the one or more safety margin data,
wherein the one or more geometry monitors comprise at least one of:
a peer avoidance geometry monitor;
a keep-in geofencing geometry monitor;
a keep-out geofencing geometry monitor; or
a terrain avoidance geometry monitor.

7. The system of claim 1, wherein the one or more sub-monitors are configured to be provably and/or exhaustively testable.

8. The system of claim 1, wherein the primary control output comprises at least one of waypoints, guidance commands, or inner loop commands,
wherein the guidance commands include at least one of airspeed, heading, altitude, or vertical speed,
wherein the inner loop commands include at least one of pitch or bank.

9. The system of claim 1, wherein at least one of the set of fallback actions comprises at least one of: a turn circle, a Bezier curve, or a timeseries of guidance commands.

10. A method for integrity monitoring, the method comprising:
generating primary control output via a primary module, the primary control output configured to be used to control an autonomous vehicle (AV);
receiving situational data comprising AV data and environmental data;
generating, using a monitor module configured to monitor the AV, a set of fallback actions based on at least the situational data; and
generating, using the monitor module, a fallback status based on at least the set of fallback actions,
wherein the fallback status is configured to correspond to a determination of whether to override the primary control output,
wherein the monitor module comprises one or more sub-monitors,
wherein each fallback action of the set of fallback actions comprises one or more safety margin data,
wherein each of the one or more safety margin data for the each fallback action is based on at least the situational data and the each fallback action, and is generated via a sub-monitor of the one or more sub-monitors.

11. The method of claim 10, the method further comprising controlling the AV based on at least the fallback status.

12. The method of claim 11, the controlling the AV further based on at least a safe guidance control output of the monitor module, the safe guidance control output based on at least the set of fallback actions and the situational data.

13. The method of claim 10, wherein the one or more safety margin data is indicative of at least one of:
a remaining safety margin distance within which a controlled action is determined to be able to be completed by the AV, the controlled action corresponding to the each fallback action;
a remaining safety margin time within which the controlled action is determined to be able to be completed by the AV; or
a likelihood of the AV being able to successfully and/or safely complete the controlled action at a given time.

14. The method of claim 13, wherein the one or more sub-monitors are configured to normalize the one or more safety margin data such that any one of the one or more safety margin data may be uniformly compared to any other one of the one or more safety margin data.

15. The method of claim 14, wherein the one or more sub-monitors comprise one or more geometry monitors,
wherein each geometry monitor of the one or more geometry monitors is configured to generate one or more geometry safety margin data of the one or more safety margin data,
wherein the one or more geometry monitors comprise at least one of:
a peer avoidance geometry monitor;
a keep-in geofencing geometry monitor;
a keep-out geofencing geometry monitor; or
a terrain avoidance geometry monitor.

16. The method of claim 10, wherein the one or more sub-monitors are configured to be provably and/or exhaustively testable.

17. The method of claim 10, wherein the primary control output comprises at least one of waypoints, guidance commands, or inner loop commands,
wherein the guidance commands include at least one of airspeed, heading, altitude, or vertical speed,
wherein the inner loop commands include at least one of pitch or bank.

18. The method of claim 10, wherein at least one of the set of fallback actions comprises at least one of: a turn circle, a Bezier curve, or a timeseries of guidance commands.

* * * * *